United States Patent
Mizuno et al.

(10) Patent No.: US 8,299,782 B2
(45) Date of Patent: Oct. 30, 2012

(54) POSITION SENSOR, OPTICAL HEAD DEVICE, HEAD MOVING MECHANISM, INFORMATION RECORDING AND REPRODUCTION DEVICE AND POSITION CONTROL SYSTEM

(75) Inventors: Osamu Mizuno, Osaka (JP); Hiroshi Yamamoto, Kyoto (JP); Takuya Wada, Kyoto (JP); Hideki Aikoh, Osaka (JP); Kanji Wakabayashi, Kyoto (JP); Takatoshi Yukimasa, Osaka (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 11/918,613

(22) PCT Filed: Apr. 18, 2006

(86) PCT No.: PCT/JP2006/308147
§ 371 (c)(1),
(2), (4) Date: Oct. 16, 2007

(87) PCT Pub. No.: WO2006/115129
PCT Pub. Date: Nov. 2, 2006

(65) Prior Publication Data
US 2009/0072818 A1    Mar. 19, 2009

(30) Foreign Application Priority Data
Apr. 19, 2005    (JP) .................. 2005-120568

(51) Int. Cl.
*G01B 7/14*    (2006.01)
(52) U.S. Cl. .............. 324/207.24; 360/250; 720/660; 396/55; 396/87

(58) Field of Classification Search ............ 324/207.24, 324/207.26; 720/660
See application file for complete search history.

(56) References Cited

U.S. PATENT DOCUMENTS

| 5,193,080 | A | * | 3/1993 | Mohri et al. | .................. 720/660 |
| 5,369,361 | A | * | 11/1994 | Wada | ......................... 324/207.2 |
| 5,889,400 | A | * | 3/1999 | Nakazawa | ................. 324/207.2 |
| 6,496,003 | B1 | | 12/2002 | Okumura et al. | |
| 6,552,532 | B1 | | 4/2003 | Sako | |
| 6,798,195 | B2 | * | 9/2004 | Luetzow | ..................... 324/207.2 |
| 6,867,583 | B2 | * | 3/2005 | Mizutani et al. | ........ 324/207.24 |

(Continued)

FOREIGN PATENT DOCUMENTS
EP    1 099 929    5/2001
(Continued)

OTHER PUBLICATIONS

English machine translation of the claims and detailed description of JP 05182216 A, obtained on Apr. 19, 2010.*

(Continued)

*Primary Examiner* — Patrick Assouad
*Assistant Examiner* — David M. Schindler
(74) *Attorney, Agent, or Firm* — Wenderoth, Lind & Ponack, L.L.P.

(57) ABSTRACT

As imaging devices are miniaturized, and optical devices are miniaturized, lens moving mechanisms are also miniaturized. Thus, position sensors for them are required to be miniaturized and have high accuracy at low cost. A magnet of a pillar shape and a yoke which move in the X axis direction with respect to a magnetic field detection element are provided, and a shape of a cross section of the yoke which is orthogonal to a longitudinal direction of the magnet changes along the longitudinal direction.

16 Claims, 13 Drawing Sheets

U.S. PATENT DOCUMENTS

| | | | |
|---|---|---|---|
| 6,992,478 B2 * | 1/2006 | Etherington et al. | 324/207.24 |
| 7,023,201 B2 * | 4/2006 | Sogge et al. | 324/207.25 |
| 7,268,536 B2 * | 9/2007 | Hagino et al. | 324/207.24 |
| 2004/0032254 A1 * | 2/2004 | Suzuki et al. | 324/207.24 |

FOREIGN PATENT DOCUMENTS

| | | |
|---|---|---|
| JP | 4-34312 | 2/1992 |
| JP | 05182216 A * | 7/1993 |
| JP | 2004-286637 | 10/2004 |
| JP | 3597733 | 12/2004 |
| WO | 00/05548 | 2/2000 |

OTHER PUBLICATIONS

International Search Report of Jul. 18, 2006 issued in the International Application No. PCT/JP2006/308147.

* cited by examiner

POSITION SENSOR, OPTICAL HEAD DEVICE, HEAD MOVING MECHANISM, INFORMATION RECORDING AND REPRODUCTION DEVICE AND POSITION CONTROL SYSTEM

BACKGROUND OF THE INVENTION

I. Technical Field

The present invention relates to a position sensor for precise positioning which is particularly suitable for devices which are required to be precise and miniaturized, such as portable imaging devices, medical devices, and the like, since the position sensor can be made small with non-contact detection.

II. Description of the Related Art

In recent years, imaging devices, such as cellular phones with an image capturing function, digital cameras, and the like, have become small and precise with more functions. Such imaging devices include mechanisms to move lenses and/or other components for autofocusing, zooming, image stabilizaion, and the like.

In the field of optical discs, optical pickups compatible with high-density recording include lens moving means for compensating for aberration of systems. For applying the devices to portable use, or incorporating to portable game machines, or the like, the optical pickups are required to be miniaturized.

For moving lenses with a high speed and high accuracy, it is desirable to provide a position sensor for a moving lens or the like in order to improve the response of a control system. However, motors and/or actuators which can be used in such small devices are limited in terms of shape and/or electric power. Thus, non-contact sensors that are desirable in view of the load, and optical detection, magnetic field detection, and the like, are used for sensor means.

A position detection means includes: digital means which mainly performs a pulse count of the amount of shift from an initial position; and analog means which mainly specifies an absolute position. As is well known, the former is accurate but requires an initial position detection operation, and the latter can specify the position instantly but the properties vary depending upon a temperature, and/or S/N ratio, and thus, the accuracy is lower than that of the former. These characteristics are complementary.

Small portable devices are often required to have immediacy. Thus, analog means may be useful in many cases if the accuracy is permissible.

When a position sensor is formed as such analog means, a position sensor using a magnetic field is employed in many cases, since optical detection has a nonlinear complicated temperature characteristic and is relatively expensive.

A conventional example of a position sensor using a magnetic field will be described based on Japanese Patent Gazette No. 3597733 (FIGS. 2 and 3). In FIG. 13, reference numeral 91 denotes a Hall element which serves as magnetic field detection portion. The Hall element 91 generates a voltage proportional to a magnetic flux density in the Z axis direction shown in the figure.

Reference numeral 92 denotes a permanent magnet which serves as a magnetic field generation portion. The permanent magnet 92 is polarized (magnetized) in a direction indicated by arrow M in the figure. The permanent magnet 92 is formed such that both ends become distant from the Hall element 91.

The permanent magnet 92 is formed so as to be movable relative to the Hall element 91 in X axis direction shown in FIG. 13.

When the permanent magnet 92 moves relative to the Hall element 91 in the X axis direction shown in FIG. 13, a magnetic field in the Z axis direction being applied to the Hall element 91 is changed between the N-pole and the S-pole, and a electric signal corresponding to the change in the magnetic field is output from the Hall element 91. This means that the position of the permanent magnet 92 in the X axis direction is detected from the output of the Hall element 91.

If the relationship between the position of the permanent magnet 92 in the X axis direction and the output voltage of the Hall element 91 is linear, that is, if the position of the permanent magnet 92 in the X axis direction and a strength of the magnetic field in the Z axis direction being applied at the position of the Hall element 91 are linear, conversion from the output voltage into the position can be readily performed.

With an ordinary magnet, a magnetic field is strong at magnetic poles in both ends, and linearity deteriorates. Thus, in this example, the permanent magnet 92 is formed to have a polygonal shape such that both ends in the magnetizing direction become distant from the Hall element 91 for compensation for improving the linearity.

Japanese Patent Gazette No. 3597733 further describes an example of improving the linearity by forming the permanent magnet into a curved surface.

SUMMARY OF THE INVENTION

However, the above conventional position sensors have the following problems.

For improving the linearity of the position and the magnetic field, the shape of the magnet is modified. Those magnets have a very small size in small devices. The most practical shape for such small magnets is a rectangular parallelepiped. Thus, it is difficult to form a magnet into a desired shape other than the rectangular parallelepiped as in the conventional example. Even if it is possible, it will increase the cost.

For solving the above-described problems, a first aspect of the invention is a position sensor including a magnetic field generation portion, a magnetic field detection portion, and a yoke. The magnetic field generation portion has a pillar shape and generates a magnetic field. The magnetic field detection portion detects a magnetic flux density of a magnetic field generated by the magnetic field generation portion. The yoke is fixed to the magnetic field generation portion so as to cover at least a part of a side opposite to a side facing the magnetic field detection portion along a longitudinal direction of the magnetic field generation portion. One of the magnetic field generation portion and the magnetic field detection portion is movable relative to the other in a predetermined moving direction. A shape of a cross section of the yoke which is orthogonal to the longitudinal direction changes along the longitudinal direction.

Since the magnetic flux density detected by the magnetic field detection portion changes based on the relative position of the magnetic field detection portion and the magnetic field generation portion, the relative position can be specified by detecting the change, allowing an operation as a position sensor.

The change in the shape of the cross section of the yoke is such that the magnetic flux density detected by the magnetic field detection portion changes linearly based on the relative position along the longitudinal direction within a range of the relative movement of the magnetic field detection portion and the magnetic field generation portion. For example, as shown in FIG. 1, a shape of a yoke 3 in the Z axis direction changes along the X axis direction such that a distance from magnetic field detection portion 1 becomes larger linearly.

A second aspect of the invention is the first aspect of the invention in which a surface of the magnetic field generation portion which opposes the magnetic field detection portion is a plane, and the opposing surface has a predetermined angle to the moving direction.

This allows the magnetic field detection portion to detect a stronger magnetic flux density at one end and to detect a weaker magnetic flux density at the other end. Thus, sensitivity of the position sensor improves. For example, as shown in FIG. 5, magnetic field generation portion 22 and a yoke 23 are tilted by θ in a positive direction of the Z axis. If magnetic field detection portion 1 is near the right end in the X axis direction, a stronger magnetic flux density compared to that when the magnetic field generation portion 22 and a yoke 23 are not tilted is detected. If the magnetic field detection portion 1 is near the left end in the X axis direction, a weaker magnetic flux density is detected. Thus, the sensitivity as the position sensor increases.

A third aspect of the invention is the first or second aspect of the invention in which the magnetic field generation portion is a magnet of a rectangular parallelepiped shape with a surface which opposes the magnetic field detection portion being a plane, and a magnetization direction of the magnetic field generation portion being a normal line direction to the opposing surface. The yoke has leg portions extending toward the magnetic field detection portion with end surfaces of the leg portions on the magnetic field detection portion side having predetermined angles to the opposing surface.

Since the magnetic flux density detected by the magnetic field detection portion changes based on the relative position of the magnetic field detection portion and the magnetic field generation portion, the relative position can be specified by detecting the change, allowing an operation as a position sensor.

As used herein, the term "rectangular parallelepiped" includes "substantially rectangular parallelepiped".

A fourth aspect of the invention is the first or second aspect of the invention in which the yoke has leg portions extending toward the magnetic field detection portion and has a shape such that a length of the leg portions change along the longitudinal direction.

The yoke according to the fourth invention is one as shown in FIG. 1 or 2, for example. As shown in FIG. 2, the yoke has a squared U-shape with a cross section on the YZ plane having an opening on a side facing magnetic field detection portion 1, and lengths of leg portions of the squared U-shape becomes shorter along the X axis direction (longitudinal direction of magnetic field generation portion 2). In the example shown in FIGS. 1 and 2, the leg lengths change such that the cross section of the yoke on the YZ plane has the squared U-shape. However, only one of the leg lengths may change along the X axis direction, which portion that the yoke has a cross section on the YZ plane of L shape, for example.

A fifth aspect of the invention is the fourth aspect of the invention in which the length of the leg portions changes linearly along the longitudinal direction.

The yoke according to the fifth invention is one as shown in FIG. 1 or 2, for example. The yoke has a squared U-shape, as shown in FIG. 2, with a cross section on the YZ plane having an opening on a side facing magnetic field detection portion 1, and the yoke becomes shorter linearly along the X axis direction (longitudinal direction of magnetic field generation portion 2). Specifically, as shown in FIG. 1, the shape of a side surface of the yoke on the XZ plane has the side shape facing the magnetic field detection portion 1 which is formed by a straight line inclined by a certain angle with respect to the X axis direction.

A sixth aspect of the invention is the fourth aspect of the invention in which the length of the leg portions changes curvilinearly along the longitudinal direction.

This allows realizing a position sensor which improves the linearity of position detection sensitivity within a range of relative movement of the magnetic field generation portion and the magnetic field detection portion.

The yoke according to the sixth invention is one as shown in FIG. 3, for example. A side surface of the yoke on the XZ plane has a convex curved shape toward magnetic field detection portion 1.

A seventh aspect of the invention is the first or second aspect of the invention in which the yoke has a plane portion of a plate shape which opposes the magnetic field generation portion, and has a shape such that a width of the plane portion orthogonal to the longitudinal direction changes along the longitudinal direction.

Since the magnetic flux density detected by the magnetic detection portion changed based on the relative position of the magnetic field detection portion and the magnetic field generation portion, the relative position can be specified by detecting the change, allowing an operation as a position sensor.

The yoke according to the seventh invention is one as shown in FIG. 7 or 8, for example. A width of the yoke in the Y axis direction (widthwise direction of the yoke) changes toward positive direction along the X axis (longitudinal direction of magnetic field generation portion 32). The change in the width of the yoke may be linear as shown in FIG. 7, or curved as shown in FIG. 8.

An eighth aspect of the invention is the first or second aspect of the invention in which the yoke has a deformed shape, such that a magnetic field generated by the magnetic field generation portion, which extends toward ends in the longitudinal direction, is suppressed at the ends.

This results in an improvement in a linearity of position detection sensitivity at ends of magnetic field generation portion, and a position sensor with a broader position detection range can be realized.

A ninth aspect of the invention is the eighth aspect of the invention in which the yoke has leg portions extending toward the magnetic field detection portion, and the deformation of the yoke is deformation in a length direction of the leg portions.

The yoke according to the ninth invention is one as shown in FIG. 3, for example. A cross sectional area of a cross section on the YZ plane near the left end is deformed to be smaller than that of the inner cross section. A side surface of the yoke on the XZ plane has a convex curved shape toward magnetic field, detection portion 1. By having a yoke of such a shape, influence of leakage magnetic field in directions other than a direction from magnetic field generation portion 2 toward the magnetic field detection portion 1 at the left end in FIG. 3, can be reduced. A linearity of detection sensitivity of the position sensor can be improved.

A tenth aspect of the invention is the eighth aspect of the invention in which the yoke has a plane portion of a plate shape which opposes the magnetic field generation portion, and the deformation of the yoke is deformation in a width direction of the plane portion orthogonal to the longitudinal direction.

The yoke according to the tenth aspect of the invention is one as shown in FIG. 9, for example. The shape of the left end and the shape of the right end on the XY plane are curved, and are shapes which suppress extension of the yoke in width direction. By having a yoke of such a shape, influence of leakage magnetic field, in directions other than a direction from magnetic field generation portion 2 toward the magnetic field detection portion 1 at the left end and the right end in FIG. 9, can be reduced. A linearity of detection sensitivity of the position sensor can be improved.

An eleventh aspect of the invention is the first or second aspect of the invention in which a length of the magnetic field generation portion in a longitudinal direction is longer than a length of the yoke in a longitudinal direction.

The yoke according to the eleventh invention is one as shown in FIG. 3. The length of yoke 13 is shorter at the right end than a length of magnetic field generation portion 2. Thus, influence of leakage magnetic field at the right end in FIG. 3 can be reduced. A linearity of detection sensitivity of the position sensor can be improved.

A twelfth aspect of the invention is an optical head device including a lens holder portion for holding a lens, a first base for holding the lens holder portion so as to be movable, and a position sensor according to any one of the first through eleventh inventions. One of the magnetic field generation portion and the magnetic field detection portion is provided on the lens holder portion, and the other is provided on the first base.

A thirteenth aspect of the invention is a head moving mechanism including a head, a head holder portion for holding the head, a second base for holding the head holder portion so as to be movable, and a position sensor according to any one of the first through eleventh inventions. One of the magnetic field generation portion and the magnetic field detection portion is provided on the head holder portion, and the other is provided on the second base.

A fourteenth aspect of the invention is an information recording and reproduction device for recording information on a recording medium and reproducing information recorded on the recording medium, which includes an optical head device according to the twelfth invention and/or a head moving mechanism according to the thirteenth invention.

A fifteenth aspect of the invention is a position control system to be included in a device having a relative moving mechanism. The relative moving mechanism has a position sensor according to any one of the first through eleventh inventions and a control portion. The control portion stores a correspondence table of data representing a position of the relative moving mechanism and output of the magnetic field detection portion of the position sensor, and controls relative movement based on the correspondence table.

A sixteenth aspect of the invention is a position sensor including magnetic field generation portion, magnetic field detection portion, and a yoke. The magnetic field generation portion has a pillar shape and generates a magnetic field. The magnetic field detection portion detects a magnetic flux density of a magnetic field generated by the magnetic field generation portion. The yoke is fixed to the magnetic field generation portion so as to cover at least a part of a side opposite to a side facing the magnetic field detection portion along a longitudinal direction of the magnetic field generation portion. One of the magnetic field generation portion and the magnetic field detection portion is movable relative to the other in a predetermined moving direction. The yoke has a shape such that a magnetic flux density detected by the magnetic field detection portion changes as the magnetic field generation portion moves relative to the magnetic field detection portion.

Since the magnetic flux density detected by the magnetic field detection portion changes based on the relative position of the magnetic field detection portion and the magnetic field generation portion, the relative position can be specified by detecting the change, allowing an operation as a position sensor.

A seventeenth aspect of the invention is the sixteenth aspect of the invention in which the yoke has a shape such that a magnetic flux density received by the magnetic field detection portion monotonically changes at least within a part of the range of the relative movement when the magnetic field generation portion moves relative to the magnetic field detection portion in the predetermined moving direction.

The magnetic flux density received by the magnetic field detection portion monotonically changes (monotonically increases or monotonically decreases) during relative movement within the range of the relative movement of the magnetic field generation portion and the magnetic field detection portion which is an area for detecting a position. Thus, by detecting a magnetic flux density at the magnetic field detection portion, the relative position can be uniquely determined. More specifically, a value of the magnetic flux density detected by the magnetic field detection portion and the relative position has one-to-one correspondence. Thus, the relative position can be detected reliably.

An eighteenth aspect of the invention is a position sensor including magnetic field generation portion, magnetic field detection portion, and a yoke. The magnetic field generation portion has a pillar shape and generates a magnetic field. A magnetic field detection portion detects a magnetic flux density of a magnetic field generated by the magnetic field generation portion. The yoke is fixed to the magnetic field generation portion so as to cover at least a part of a side opposite to a side facing the magnetic field detection portion along a longitudinal direction of the magnetic field generation portion. One of the magnetic field generation portion and the magnetic field detection portion is movable relative to the other in a predetermined moving direction. The yoke has a shape such that a magnetic resistance between the magnetic field generation portion and the yoke monotonically changes at least within a part of the range of the relative movement as the magnetic field generation portion moves relative to the magnetic field detection portion.

The magnetic resistance between the magnetic field generation portion and the magnetic field detection portion monotonically changes during relative movement within the range of the relative movement of the magnetic field generation portion and the magnetic field detection portion which is an area detecting a position. The magnetic flux density received by the magnetic field detection portion also monotonically changes. Thus, by detecting a magnetic flux density at the magnetic field detection portion, the relative position can be uniquely determined. More specifically, a value of the magnetic flux density detected by the magnetic field detection portion and the relative position has one-to-one correspondence. Thus, the relative position can be detected reliably.

According to the present invention described above, a position sensor which can be readily realized at low cost and is compatible with small portable devices can be provided.

DETAILED DESCRIPTION OF THE INVENTION

Hereinafter, embodiments of the present invention will be described with reference to FIGS. 1 through 13.

Embodiment 1

Figure 1A:
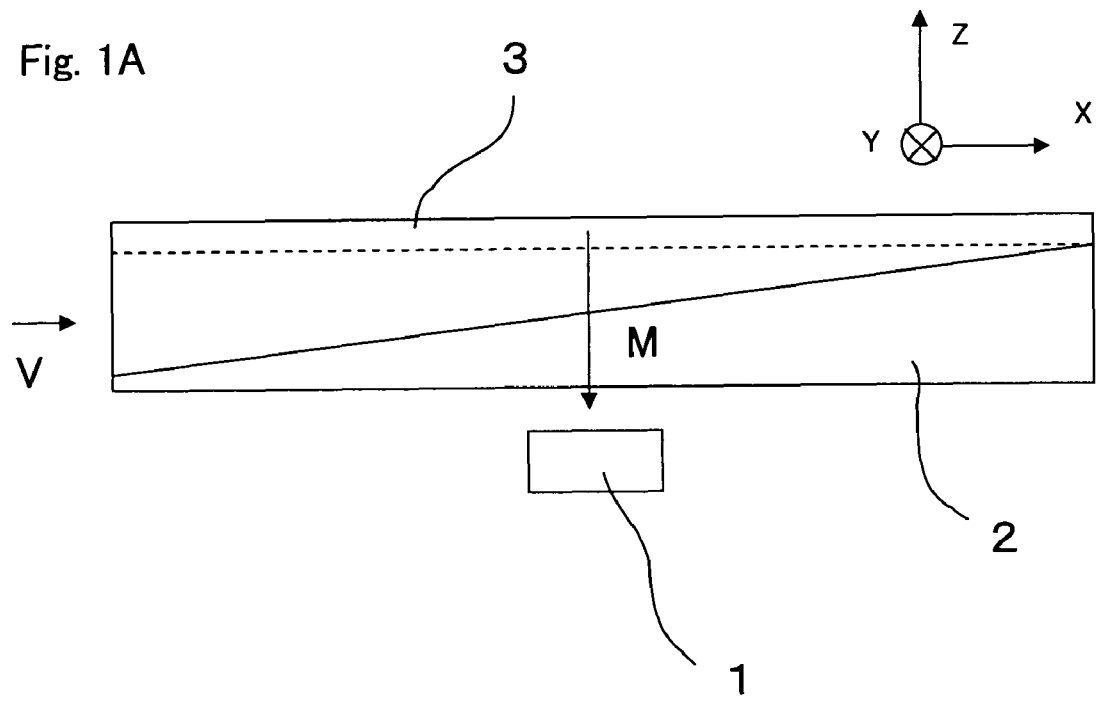
FIGS. 1A and 1B are diagrams showing a position sensor according to Embodiment 1 of the present invention.
Figure 1B:
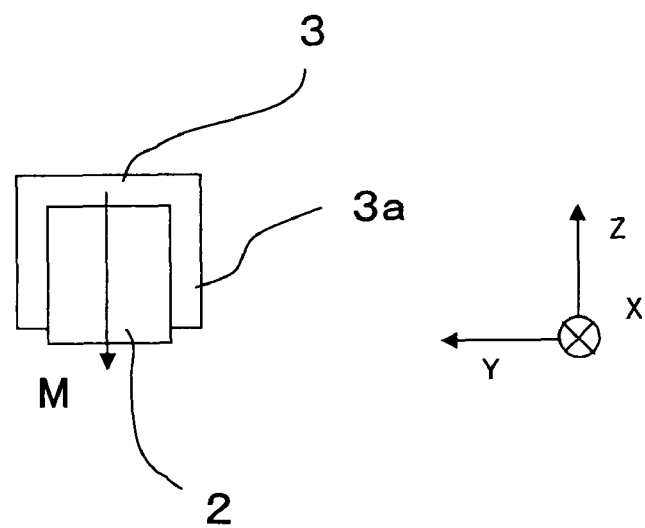

FIGS. 1A and 1B show a position sensor according to Embodiment 1 of the present invention. FIG. 1A is a side view; and FIG. 1B is a diagram viewed from the V direction in FIG. 1A.

In FIGS. 1A and 1B, reference numeral 1 denotes a Hall element as the magnetic field detection portion; reference numeral 2 denotes a magnet as the magnetic field generation portion; and reference numeral 3 denotes a yoke fixed to the magnet 2. Coordinate axes are as shown in the figure. The Hall element 1 is same as the Hall element 51 in the conventional example.

The Hall element 1 has a function to output a voltage proportional to a magnetic flux density in a direction substantially parallel to the Z axis. Although it is not shown in the figure, the output is connected to an appropriate amplification circuit.

The magnet 2 has substantially a rectangular parallelepiped shape, and is polarized (magnetized) in a direction indicated by letter M in the figure. As shown in FIG. 1B, the yoke 3 is formed of a soft magnetic material, for example, to have a cross section parallel to the YZ plane which is substantially a squared U-shape. Leg portions 3A in the squared U-shape are substantially parallel to the XZ plane. A length of the leg portions 3A changes linearly along the X axis.

The magnet 2 and the yoke 3 are integrally fixed to each other, and are formed so as to be movable relative to the Hall element 1 in a direction parallel to the X axis.

Figure 2A:
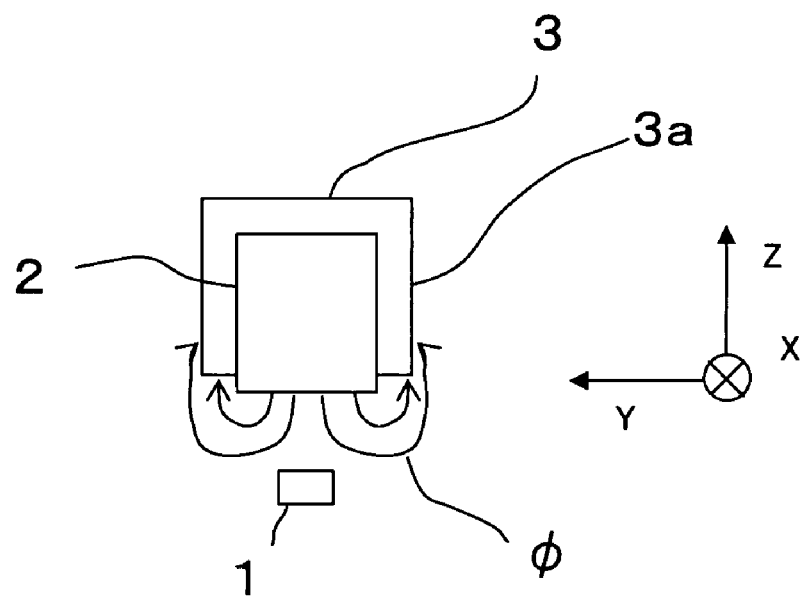
FIGS. 2A through 2C are diagrams showing a change in a magnetic flux density of the position sensor according to Embodiment 1 of the present invention.
Figure 2B:
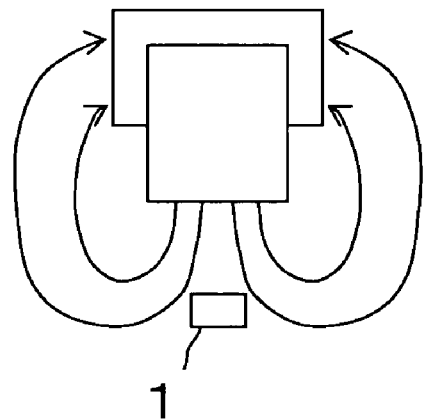
Figure 2C:
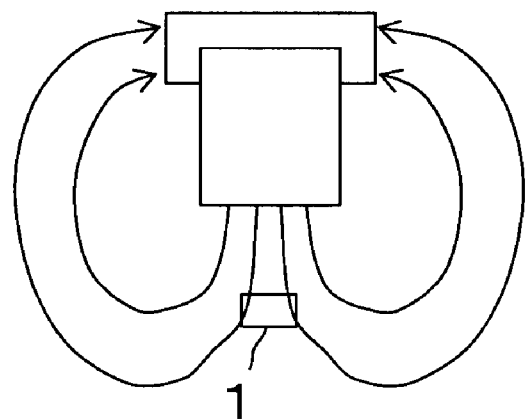

Hereinafter, operations of a position sensor having the above-described structure will be described with reference to FIGS. 2A through 2C.

When the magnet 2 and the yoke 3 move in the direction parallel to the X axis, the length of the leg portions 3a of the yoke 3 at a position of the Hall element 1 relatively changes. When the length of the leg portions 3a is long, as shown in FIG. 2A, a magnetic flux density being applied to the Hall element 1 is lower compared to when the length is short, since the magnetic resistance is lower and the leakage magnetic flux ϕ is reduced. In other words, as the magnet 2 and the yoke 3 move in the direction parallel to the X axis, the output of the Hall element 1 changes. The output in this example is represented by curve K in FIG. 4. A relative position in the X axis direction of the Hall element 1 which is a magnetic field detection element to the magnet 2 and the yoke 3 which are a magnetic field generation element can be detected as the output of the Hall element 1 within an effective range shown in the figure, for example. The size of the magnet 2 and the yoke 3 is set depending upon the required width of the effective range.

The present embodiment can be realized with the cost lower than that for the conventional example. The yoke 3 can be formed by pressing, or the like, at a low cost. The magnet 2 has a rectangular parallelepiped shape and a single area is magnetized. Thus, it can be formed most easily and the cost can be reduced.

Figure 3:
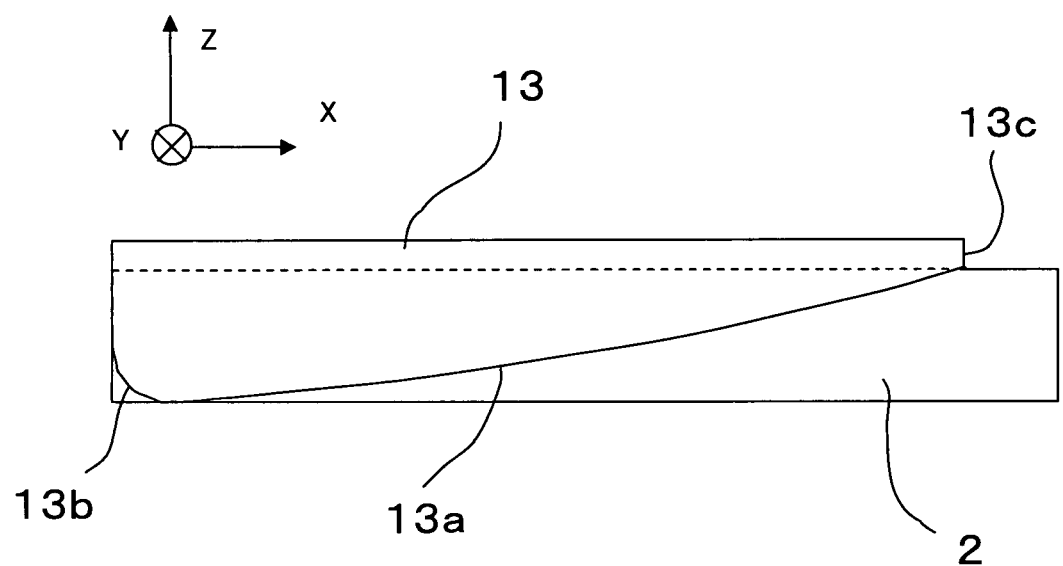
FIG. 3 is a diagram showing an improved shape of the position sensor according to Embodiment 1 of the present invention.

The linearity of the magnetic field can be improved in forming the yoke. FIG. 3 shows an example, in which the linearity is improved by modifying the shape of the leg portions and the like, as a yoke 13. Differences from the yoke 3 are that a slope 13a has a convex curved surface, a corner 13b is curved; and a tip portion 13c is shortened.

Figure 4:
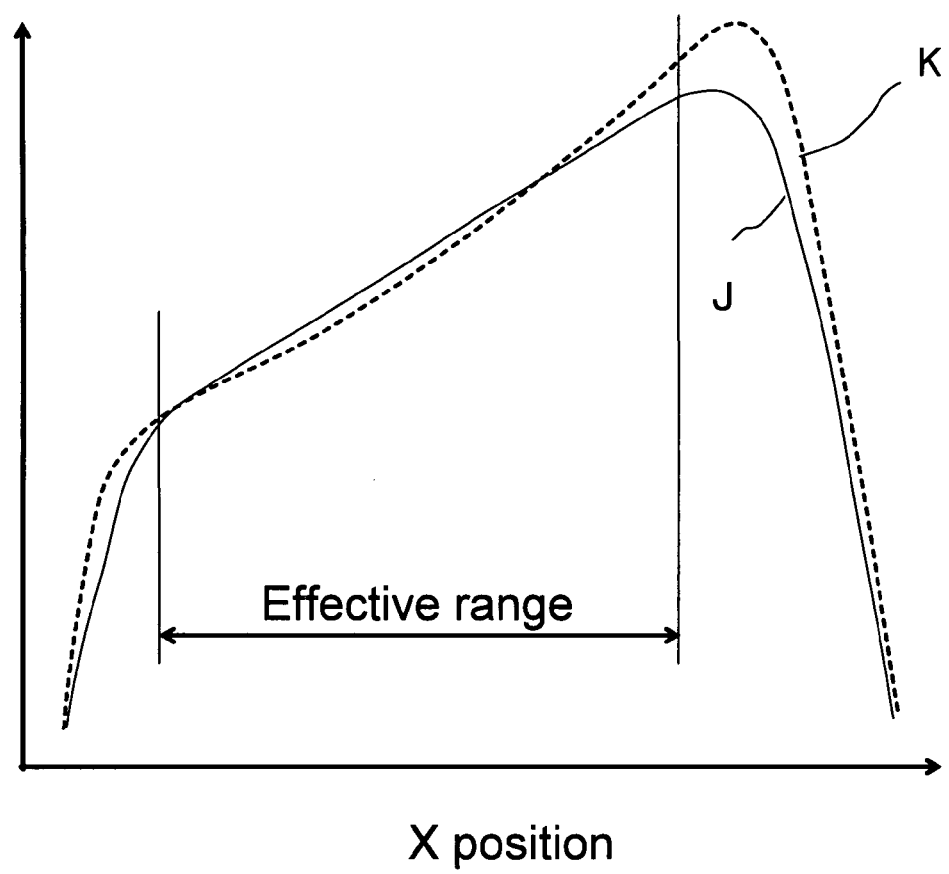
FIG. 4 is a diagram showing an output of the improved version of the position sensor according to Embodiment 1 of the present invention.

An output in such an example is also shown in FIG. 4. Curve K represents the output by the above yoke 3, and curve J represents the output by the improved yoke 13. The figure shows that the linearity is improved. In the present embodiment, distribution can be adjusted by modifying the shape of the yoke. The shape can be readily formed by pressing or the like. Thus, there is no influence in the cost.

In general, both ends of the magnet have less magnetic resistances due to leakage of magnetism to the side. Thus, in the magnetic yoke having a linear shape, a change in the magnetic flux density due to a distance to the Hall element is large at both ends. This may deteriorate the linearity of the output from the Hall element 1. For example, curve K in FIG. 4 illustrates that the magnetic flux density increases at both ends as the magnetic resistance is reduced.

In the yoke 13, the corner 13b at the left end as shown in FIG. 3 is curved, and the tip portion 13c at the right end is shortened in order to prevent the magnetic resistances at the both ends from being reduced. Further, for reducing the magnetic resistance near the center, the slope 13a is formed to have a convex curved surface. Such a shape is effective in improving the linearity of the magnetic flux density. Curve J in FIG. 4 represents an example in which the linearity of the output from the Hall element 1 within the effective range is improved by such measures.

Embodiment 2

Figure 5:
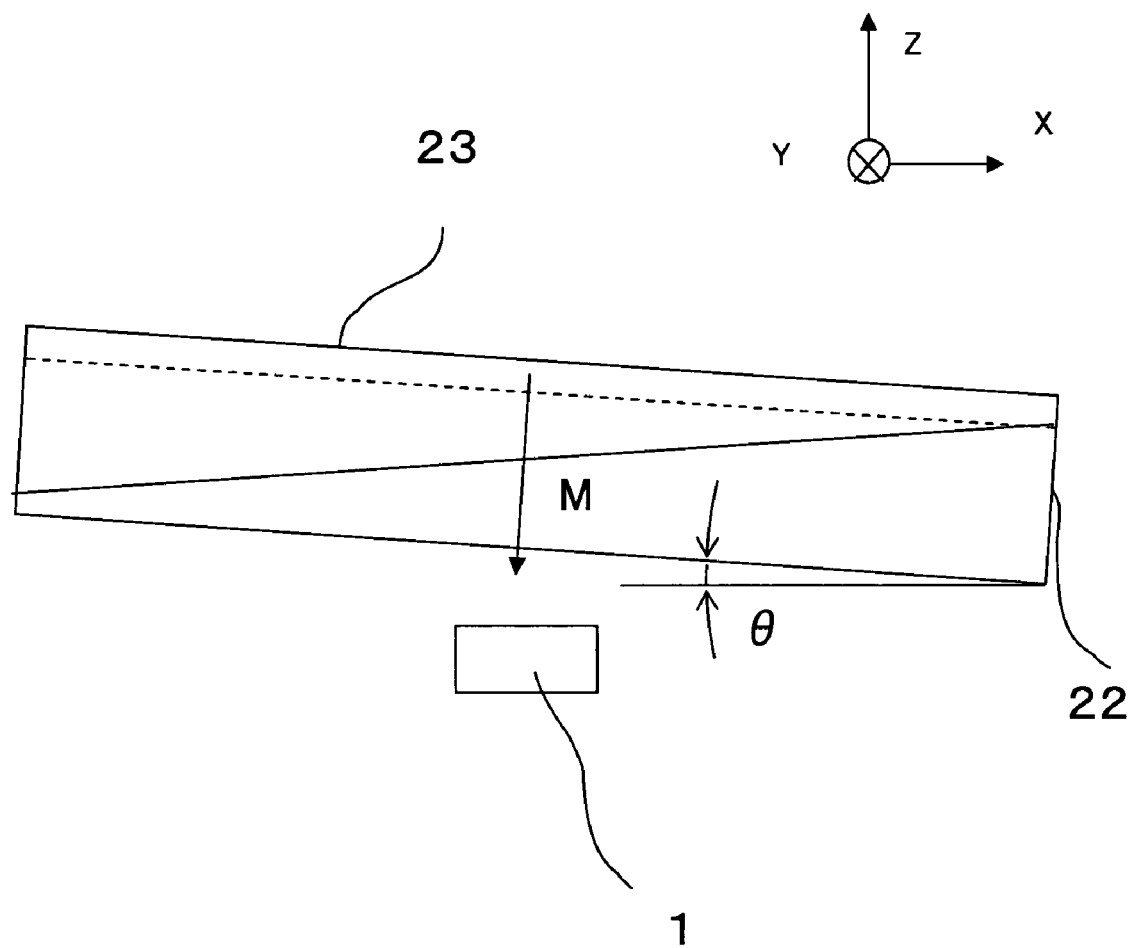
FIG. 5 is a diagram showing a position sensor according to Embodiment 2 of the present invention.

FIG. 5 shows a position sensor according to Embodiment 2 of the present invention.

The Hall element 1 is the same as that in Embodiment 1. A magnet 22 and a yoke 23 are respectively the same as the magnet 2 and the yoke 3, but are rotated from the X axis around the Y axis by tilt θ, given that the direction of the movement relative to the Hall element 1 is X axis direction. The tilt θ is set such that the right end in the figure which has a higher magnetic flux density even when there is no tilt becomes closer to the Hall element 1.

The magnetization direction of the magnet 22 is a direction indicated by the letter M in the figure, which is a normal line direction to the plane. Other parts of structure are the same as those in Embodiment 1.

Hereinafter, operation of the position sensor of Embodiment 2 which has the above-described structure will be described.

Figure 6:
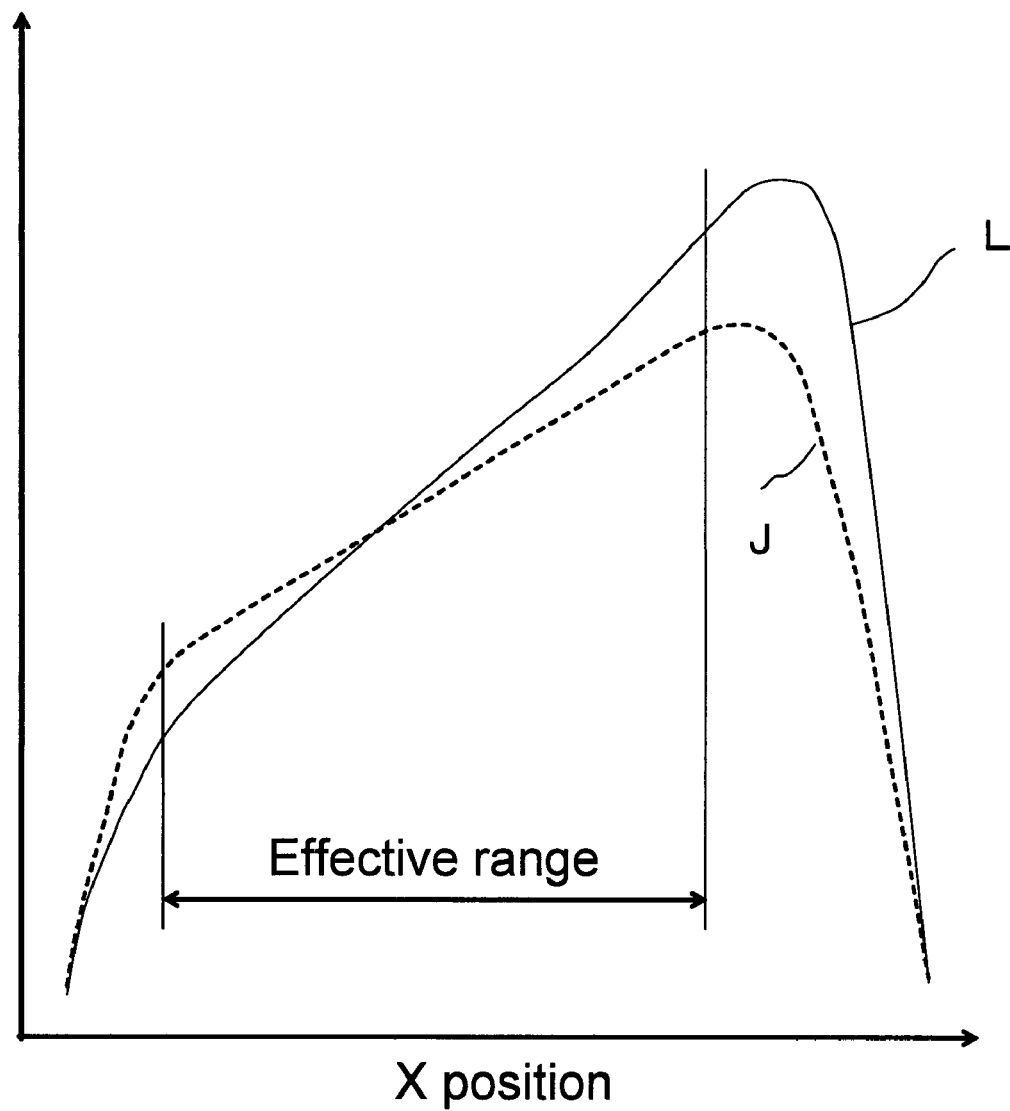
FIG. 6 is a diagram showing an output of the position sensor according to Embodiment 2 of the present invention.

A mechanism of operation of the present embodiment is similar to that in Embodiment 1. However, since the magnet 22 and the yoke 23 are tilted by θ, the side with a high magnetic flux density in Embodiment 1 has further high magnetic flux density, and the side with a low magnetic flux density has further low magnetic flux density. FIG. 6 shows an output in this example. Curve J in FIG. 6 represents the Hall element output in above Embodiment 1. Curve L represents the output in Embodiment 2. The figure shows that the curve L has a larger amount of change than the curve J for the same amount of position shift. This means that the sensitivity is increased.

However, a change in the magnetic flux density with respect to a distance is not linear. Thus, as indicated by the right end of the curve L, the magnetic flux density becomes significantly large where the magnet 22 is close to the Hall element 1. This may deteriorate the linearity. Even in such a case, by applying the present invention with an adjustment as in the yoke 13 of Embodiment 1, for example, the linearity can be improved so as to conform to specification demanded by a control system in which the position sensor is used without increasing the cost.

Embodiment 3

Figure 7A:
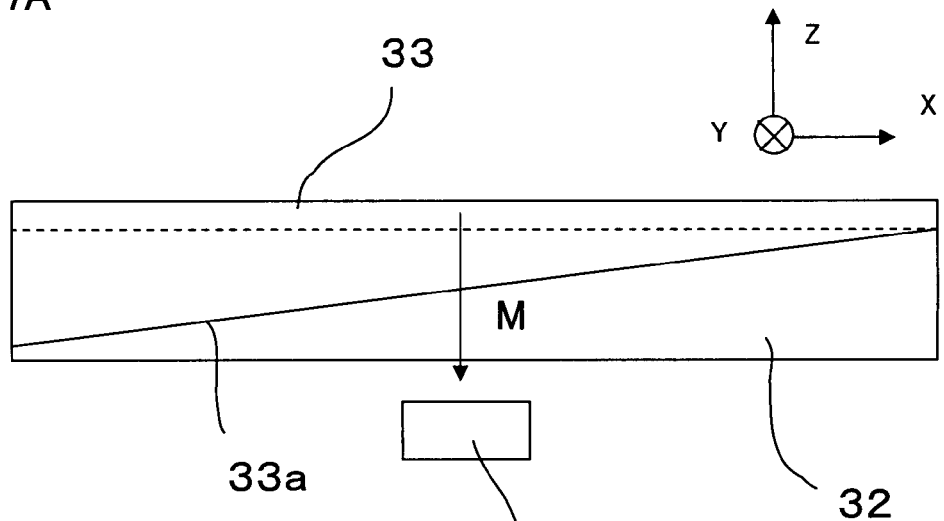
FIGS. 7A and 7B are diagrams showing a position sensor according to Embodiment 3 of the present invention.
Figure 7B:
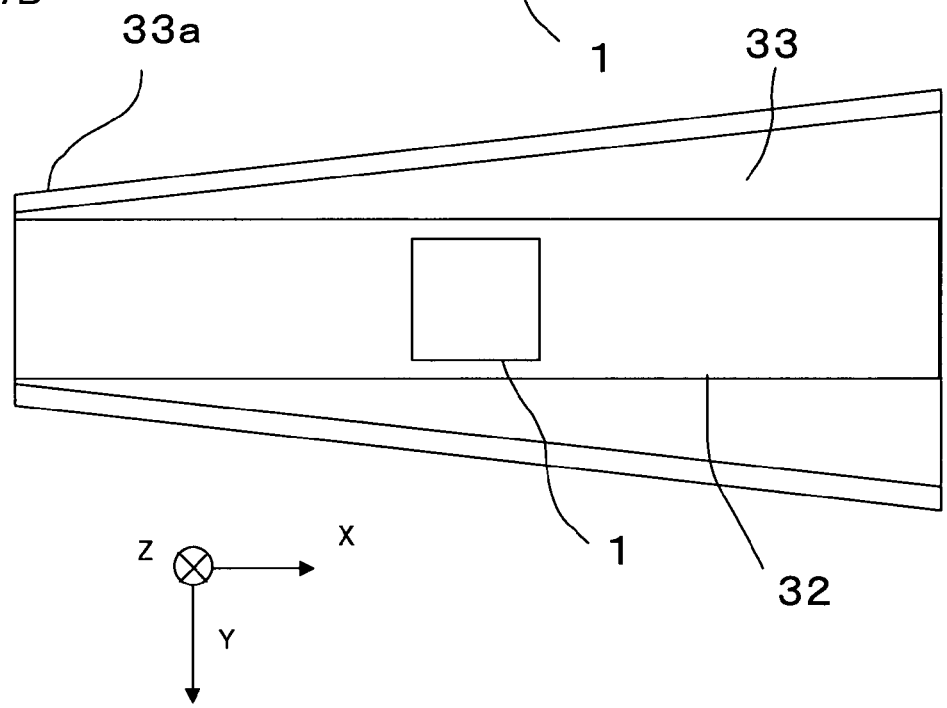

FIGS. 7A and 7B show a position sensor according to Embodiment 3 of the present invention.

The Hall element 1 and a magnet 32 are same as those in Embodiment 1. A yoke 33 has leg portions 33a having similar slope as those in Embodiment 1, and further has a width broadened linearly in the Y direction as shown in FIG. 7B. The magnetic resistance continuously changes in the virtue of both of the features.

A magnetization direction of the magnet 32 is a direction indicated by the letter M in the figure, which is a normal line direction to the surface. Other parts of the structure are same as those in Embodiment 1.

The operation of the position sensor of Embodiment 3 having the above-described structure are same as those of Embodiment 1, and will not be described further. However, the structure of the present embodiment can improve the sensitivity as in Embodiment 2.

Furthermore, the present embodiment can also have an improved linearity by curving leg portions 33a in a height direction as in Embodiment 1, and a further improved sensitivity by the tilted position as in Embodiment 2 at the same time.

Figure 8:
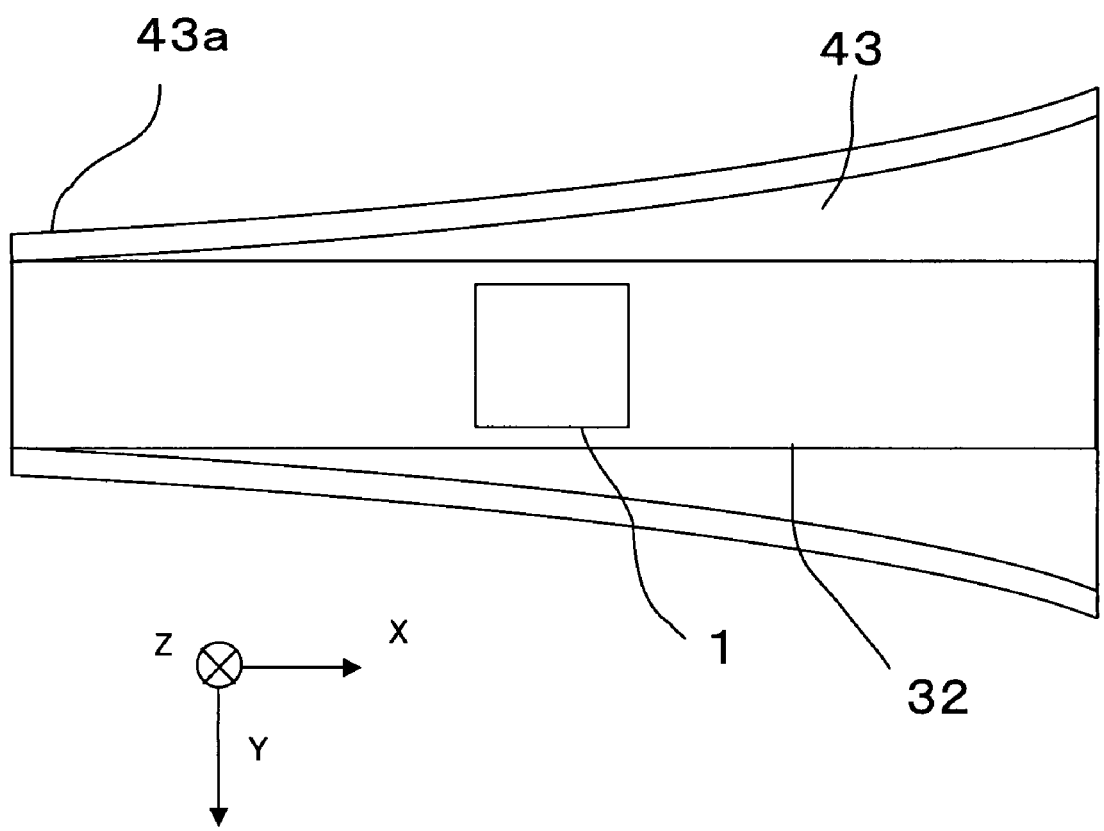
FIG. 8 is a diagram showing the position sensor according to Embodiment 3 of the present invention.

Moreover, as shown in FIG. 8 as a yoke 43, the linearity can be improved by having the yoke broadened curvilinearly in the Y direction. In general, according to the present invention, characteristics can be improved without an increase in the cost.

Figure 9A:
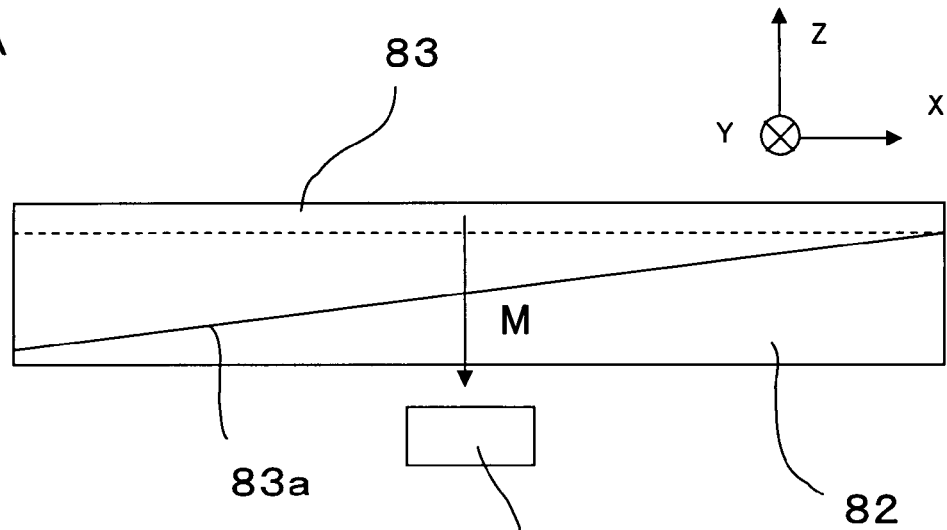
FIGS. 9A and 9B are diagrams showing the position sensor according to Embodiment 3 of the present invention.
Figure 9B:
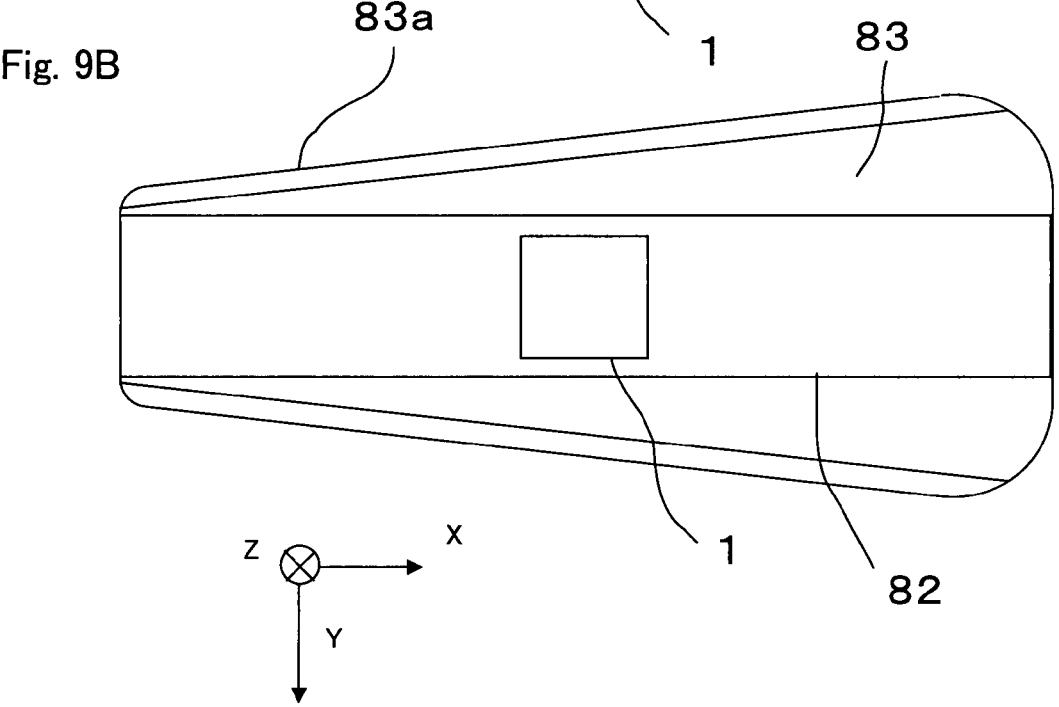

Now, improvement in the linearity in the position detection sensitivity by curving a shape of ends in the longitudinal direction of the width of the yoke will be described with reference to FIGS. 9A and 9B. The Hall element 1 and a magnet 82 are same as those in Embodiment 1. As shown in FIGS. 9A and 9B, the shape of the yoke 83 on the XY plane is curved at ends in the X axis direction. Thus, leakage of magnetic field of the magnet 82 at ends in the X axis direction can be suppressed. In this way, correlative linearity of a value of the magnetic flux density detected by the Hall element 1 and a detected value of a relative position of the magnet 82 to the Hall element 1 can be improved, and the linearity in the detection sensitivity of the position sensor can be improved.

In the above-described embodiment, the Hall element is used as magnetic filed detection portion. However, the present invention is not limited to this. For example, an MR element or the like may be used.

Although it varies among embodiments or depending upon setting values, when a distance from a center of a magnetic sensor of the Hall element to a center of a magnet is about 0.7 to 0.9 mm in Embodiment 2, for example, a length of the magnet of about 4 to 6 mm in total length is sufficient for a required effective range. The tilt θ of the magnet is desirable to be about 3 degrees in order to improve the sensitivity without increasing nonlinearity.

A material for the yoke may be a soft magnetic material such as a zinc-plated steel plate, SUS420, SUS430, and the like. As a type of the magnet, neodymium iron boron type may be used for increasing the sensitivity, and samarium cobalt type may be used when a temperature characteristic is particularly desired.

As the Hall element as the magnetic field detection element, an indium antimony type element is desirable when the sensitivity is required, and gallium arsenic type element is desirable when the linearity in the temperature characteristic is required.

Embodiment 4

Figure 10:
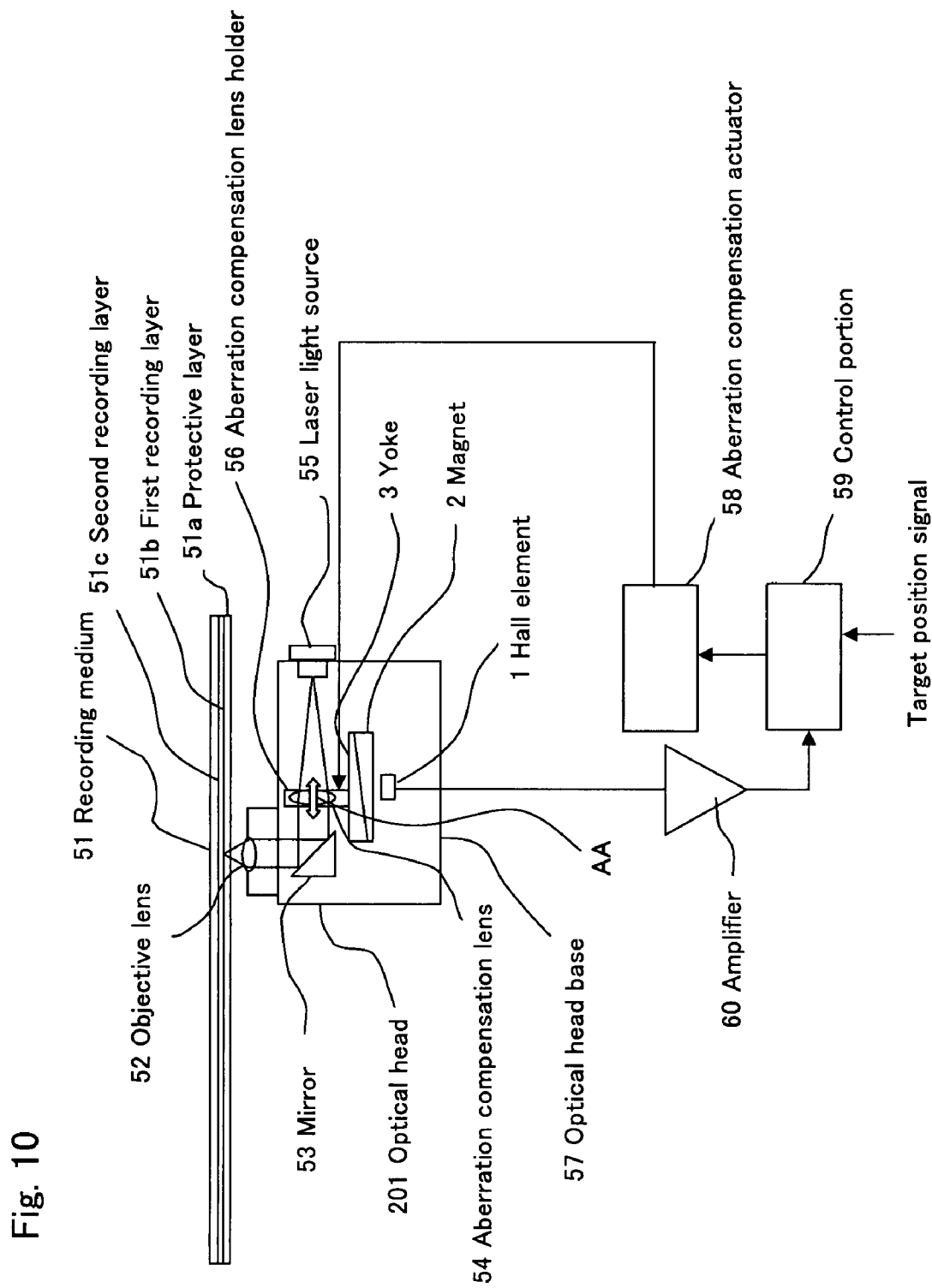
FIG. 10 is a diagram showing an optical head according to Embodiment 4 of the present invention.

FIG. 10 is a diagram showing an optical head including the position sensor of Embodiment 1 in an aberration compensation mechanism.

Reference numeral 201 denotes an optical head. Reference numeral 51 denotes a recording medium; reference numeral 52 denotes an objective lens; reference numeral 53 denotes mirror; reference numeral 54 denotes an aberration compensation lens; reference numeral 55 denotes a laser light source; reference numeral 56 denotes an aberration compensation lens holder; reference numeral 57 denotes an optical head base; reference numeral 58 denotes an aberration compensation actuator; reference numeral 59 denotes a control portion; and reference numeral 60 denotes an amplifier.

The recording medium 51 includes a protective layer 51a, a first recording layer 51b, and a second recording layer 51c. The aberration compensation lens 54 adjusts a degree of divergence and convergence of laser light rays. The objective lens 52 refracts laser light and passes it through the protective layer 51a to converge into the first recording layer 51b and the second recording layer 51c. The aberration compensation lens 54 is mounted and fixed to the aberration compensation lens holder 56. The magnet 2 and the yoke 3 are fixed to the aberration compensation lens holder 56. The Hall element 1 is fixed to the optical head base 57.

The aberration compensation lens 54, the aberration compensation lens holder 56, the yoke 3 and the magnet 2 are formed such that they can be together moved relative to the optical head base 57 in a direction indicated by arrow AA by the aberration compensation actuator 58.

The voltage output from the Hall element 1 based on the magnetic flux at the relative position of the Hall element 1 to the magnet 2 and the yoke 3 is amplified by the amplifier 60, and is output to the control portion 59 as a position signal.

The control portion 59 calculates and determines a control output to the aberration compensation actuator 58 based on the position signal from the amplifier 60 and an input of a target position signal.

The aberration compensation actuator 58 moves the aberration compensation lens holder 56 in a direction and by an amount which conform to the control output of the control portion 59.

A thickness of the protective layer as an optical distance to be passed through varies depending upon whether data is read from the first recording layer 51b or the second recording layer 51c. Typically, the objective lens 52 is designed for the protective layer of a certain thickness. If, for example, the objective lens 52 designed for reading data from a position of the first recording layer 51b is used for reading out from the second recording layer 51c, spherical aberration is generated and the quality of the optical spot deteriorates even when the convergence position is shifted. For compensating the spherical aberration, the aberration compensation lens 54 is moved.

Thus, the position of the aberration compensation lens 54 where the optical spot quality is the highest is different for the first recording layer 51b and the second recording layer 51c. However, since it takes time to search the optimal value of the aberration compensation lens 54 for each of the first recording layer 51b and the second recording layer 51c, signals S1 and S2 based on outputs of the Hall element 1 at respective optimal values are previously stored in the control portion 59.

Hereinafter, operations of the embodiment having the above-described structure will be described.

First, an operation of reading out data from the first recording layer 51b is described. The aberration compensation lens 54 is moved in AA direction such that the signal of the amplifier 60 based on the output of the Hall element 1 is S1. To achieve this, a target position signal corresponding to S1 is given to the control portion 59. Then, the control portion 59 gives a driving target signal to the aberration compensation actuator 58, and the aberration compensation lens 54 is moved. The aberration compensation lens 54 can move very rapidly since an actual procedure such as detection of spherical aberration is not necessary.

Luminous flux emitted from the laser light source 55 passes through the aberration compensation lens 54, and is reflected off the mirror 53. Then, the luminous flux passes through the protective layer 51a by the objective lens 52, and is converged at the first recording layer 51b as an optical spot. Data can be read from the reflected light.

Now, an operation of reading out data from the second recording layer 51c is described. In this operation, the aberration compensation lens 54 is moved in the AA direction such that the signal of the amplifier 60 based on the output of the Hall element 1 is S2. A target position signal corresponding to S2 is given to finish setting of movement of the aberration compensation lens 54. In this way, data can also be read from the second recording layer 51c.

As described above, in the optical head using a position sensor in Embodiment 1 of the present invention, an operation for switching between the layers of a multilayer recording medium with a high density from which data is read out can be sped up.

Embodiment 5

Figure 11:
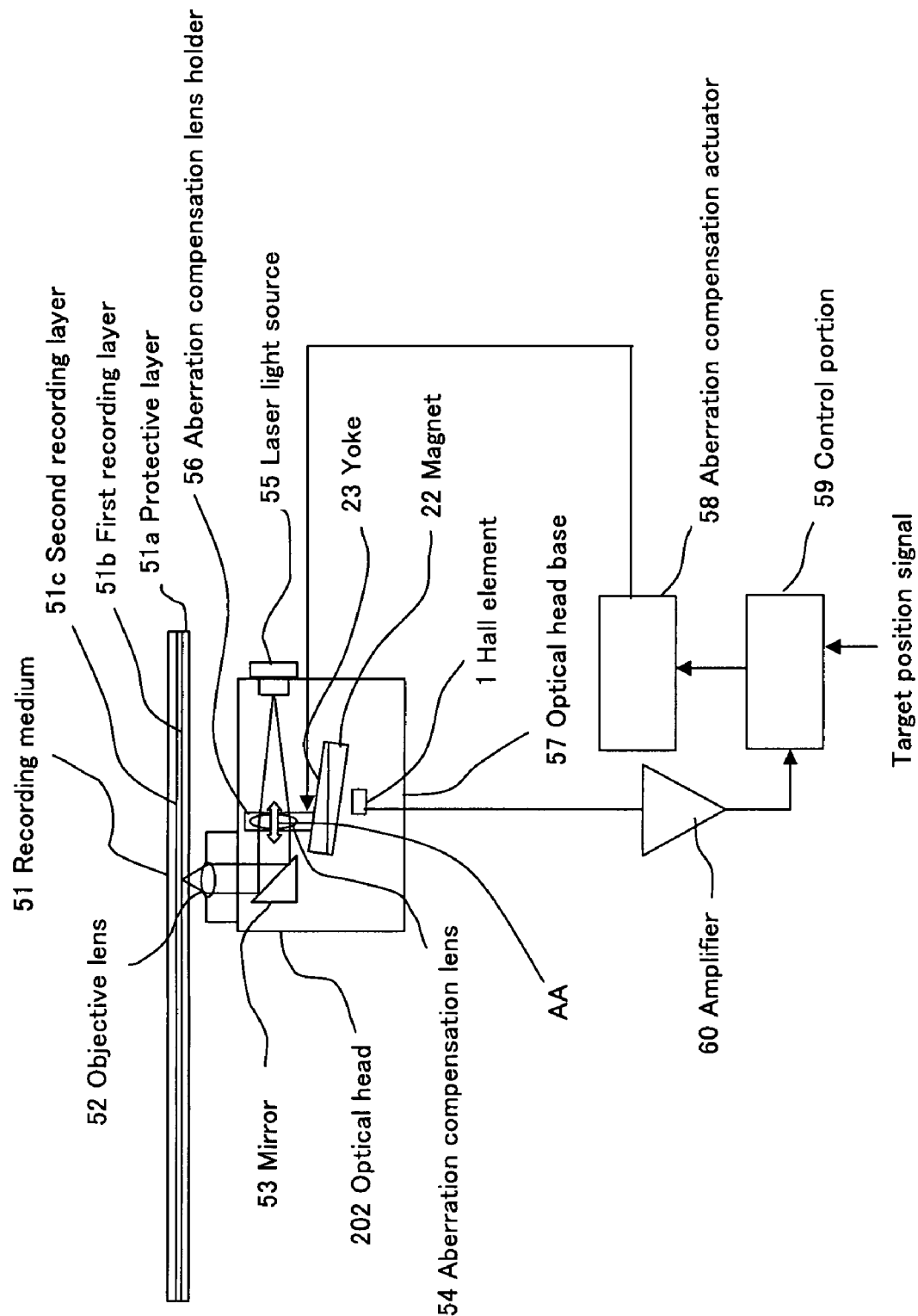
FIG. 11 is a diagram showing an optical head according to Embodiment 5 of the present invention.

FIG. 11 is a diagram showing an optical head including the position sensor of Embodiment 2 in an aberration compensation mechanism.

In the present embodiment, as shown in FIG. 11, the magnet 22 and the yoke 23 fixed to the magnet 22 which are attached to the aberration compensation lens holder 56 are tilted with respective to an upper surface of the Hall element 1. Other components are same as those in Embodiment 4, and thus, they are not described further.

The present embodiment has effects similar to those of Embodiment 4, but is better in that a Hall element voltage further good in S/N can be achieved.

Embodiment 6

Figure 12:
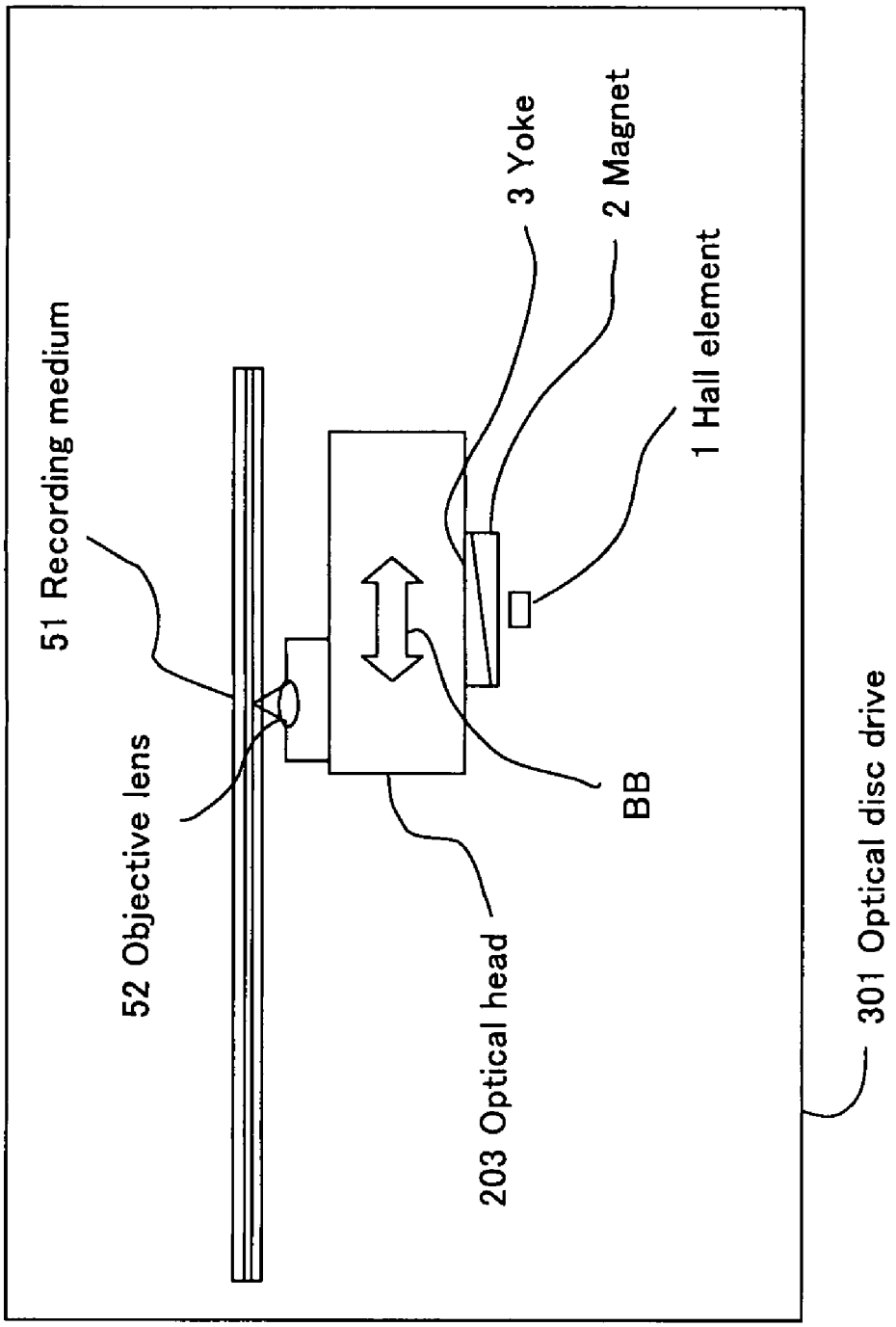
FIG. 12 is a diagram showing a head access mechanism according to Embodiment 6 of the present invention.
Figure 13:
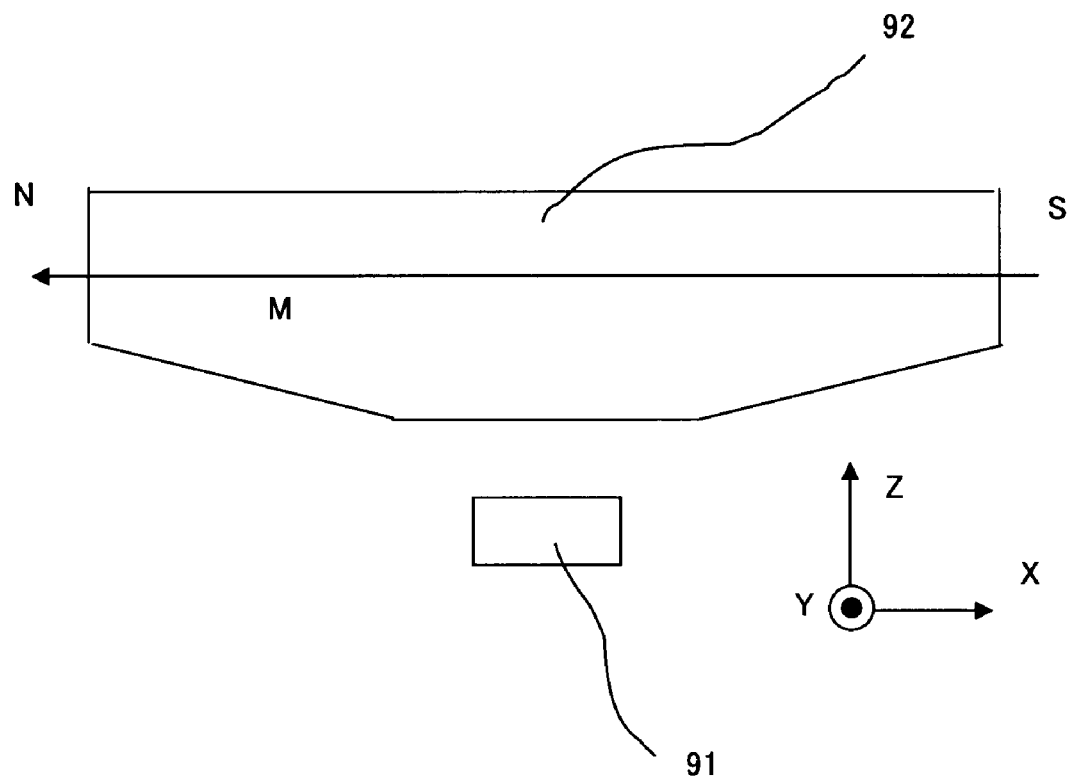
FIG. 13 is a diagram showing a conventional example.

FIG. 12 is a diagram showing an optical disc drive device including the position sensor of Embodiment 1 in an access mechanism of an optical head.

Reference numeral 301 denotes an optical disc drive; and reference numeral 203 denotes an optical head. The position sensor formed of the magnet 2, the yoke 3, and the Hall element 1 are same as that in Embodiment 1. The optical head 203 may be same as the optical heads 201 and 202 in Embodiments 4 and 5.

A direction indicated by arrow BB is a radial direction of the recording medium 51. The optical head 203 is formed so as to be movable in the BB direction by a moving mechanism (not shown). To the optical head 203, the magnet 2 and the yoke 3 are fixed. A change in the relative position to the Hall element 1 can be detected from a change in the Hall voltage of the Hall element 1. In the optical disc drive device of the present embodiment, radial position information can be obtained from the output of the Hall element 1 without necessity to read out a radial address of the recording medium 51 by the objective lens 52 by providing a relational table of the position of the optical head 203 in the radial direction and the output of the Hall element 1. Thus, an access operation of the optical head 203 can be sped up.

By providing the position sensor of Embodiment 1 in the access mechanism of the optical head, an optical disc drive device which enables a high-speed access of the optical head can be realized.

In the present embodiment, a component to be made movable is not limited to the optical head 203. Similar effects can be expected for a magnetic heads, or the like. In the present embodiment, the magnetic field generation portion is provided on a movable part. This provides an advantage that power supply is not necessary for the movable part, particularly when a permanent magnet is used. However, since the Hall element usually has a lighter weight, speeding up can be expected by providing the magnetic field detection portion on the movable part if there is no problem in wiring.

Other Embodiments

The embodiments of the present invention have been described above. However, the present invention is not limited to the above embodiments. Various modifications can be made without departing from the scope of the gist of the invention. For example, the position sensor of the present invention may be mounted to a zooming mechanism or auto-focusing mechanism of a camera or the like to realize a camera or the like which can perform position adjustment and detection with high performance.

A position sensor according to the present invention can be mounted to a device which has to perform position adjustment, and to be precise and miniaturized. Thus, the present invention is useful in various fields where position adjustment is required. The position sensor according to the present invention may be carried out in those fields.

The invention claimed is:

1. A position sensor, comprising:
   a magnetic field generation portion having a pillar shape, and which generates a magnetic field, the magnetic field generation portion having a first side and a second side opposite the first side;

a magnetic field detection portion for detecting a magnetic flux density of a magnetic field generated by the magnetic field generation portion, and facing the first side; and a yoke fixed to the magnetic field generation portion so as to cover at least a part of the second side along a longitudinal direction of the magnetic field generation portion, the yoke having a first end and a second end, wherein one of the magnetic field generation portion and the magnetic field detection portion is movable relative to the other in a predetermined moving direction, so as to define a range of relative movement, wherein the yoke has leg portions extending toward a plane parallel to and along the first side of the magnetic field generation portion, wherein within a part of the range of relative movement, the yoke is U-shaped in a plane that is normal to an axis parallel to and along the predetermined moving direction, and wherein a shape of the leg portions of the yoke adjacent the first end of the yoke is different from a shape of the leg portions of the yoke adjacent the second end of the yoke.

2. The position sensor according to claim 1, wherein the first side of the magnetic field generation portion which faces the magnetic field detection portion is a plane, and the first side has a predetermined angle other than zero degrees and 180 degrees relative to the moving direction.

3. The position sensor according to claim 1, wherein
the magnetic field generation portion is a magnet having a rectangular parallelepiped shape, the first side facing the magnetic field detection portion and being a plane, and a magnetization direction of the magnetic field generation portion is a normal line direction relative to the first side; and each leg portion of the leg portions of the yoke has an end surface and each end surface has a predetermined angle other than zero degrees and relative to the second side.

4. The position sensor according to claim 1, wherein the leg portions extend a first distance in a direction from the second side to the first side at a first position along the longitudinal direction, and extend a second distance in the direction from the second side to the first side at a second position along the longitudinal direction, and the leg portions have a slope shape such that the first distance is less than the second distance.

5. The position sensor according to claim 1, wherein the leg portions have a curvilinearly shape along the longitudinal direction.

6. The position sensor according to claim 1, wherein the yoke has a plane portion having a plate shape which opposes the magnetic field generation portion, and has a shape adjacent the first end of the yoke that is different from a shape adjacent the second end of the yoke.

7. The position sensor according to claim 1, wherein the yoke is formed in a shape such that at the first end of the yoke in the longitudinal direction, the yoke has a curved shape for suppressing a magnetic field generated by the magnetic field generation portion which extends toward the first and second ends of the yoke.

8. The position sensor according to claim 7, wherein the yoke has a plane portion of a plate shape which opposes the magnetic field generation portion, and has a shape adjacent the first end of the yoke that is different from a shape adjacent the second end of the yoke.

9. The position sensor according to claim 1, wherein a length of the magnetic field generation portion in the longitudinal direction of the magnetic field generation portion is longer than a length of the yoke in a longitudinal direction of the yoke.

10. An optical head device, comprising:
a lens holder portion for holding a lens;
a base for holding the lens holder portion, the base being movable relative to the lens holder; and
the position sensor according to claim 1,
wherein one of the magnetic field generation portion and the magnetic field detection portion is provided on the lens holder portion, and the other is provided on the base.

11. A head moving mechanism, comprising:
a head;
a head holder portion for holding the head;
a base for holding the head holder portion, the base being movable relative to the head holder; and
the position sensor according to claim 1,
wherein one of the magnetic field generation portion and the magnetic field detection portion is provided on the head holder portion, and the other is provided on the base.

12. An information recording and reproduction device for recording information on a recording medium and reproducing information recorded on the recording medium, comprising the optical head device according to claim 10.

13. A position control system to be included in a device having a relative moving mechanism, wherein:
the relative moving mechanism has the position sensor according to claim 1 and a control portion; and
the control portion stores a correspondence table of data representing a position of the relative moving mechanism and output of the magnetic field detection portion of the position sensor, and controls relative movement based on the correspondence table.

14. The position sensor according to claim 1
wherein the shape of the yoke is such that a magnetic resistance between the magnetic field generation portion and the yoke monotonically changes at least within the part of the range of the relative movement as the magnetic field generation portion moves relative to the magnetic field detection portion.

15. A position sensor, comprising:
a magnetic field generation portion having a pillar shape, a first side, and a second side opposite the first side, and which generates a magnetic field;
a magnetic field detection portion for detecting a magnetic flux density of a magnetic field generated by the magnetic field generation portion, the magnetic field detection portion facing the first side of the magnetic field generation portion; and
a yoke fixed to the magnetic field generation portion so as to cover at least a part of the second side along a longitudinal direction of the magnetic field generation portion, wherein
one of the magnetic field generation portion and the magnetic field detection portion is movable relative to the other in a predetermined moving direction, so as to define a range of relative movement, and
wherein the yoke has leg portions extending toward a plane parallel to and along the first side of the magnetic field generation portion,
wherein within a part of the range of relative movement, the yoke is U-shaped in a plane that is normal to an axis parallel to and along the predetermined moving direction,
wherein the yoke has a shape such that a magnetic flux density detected by the magnetic field detection portion changes as the magnetic field generation portion moves relative to the magnetic field detection portion, and wherein a shape of the leg portions of the yoke adjacent a first end of the yoke is different from a shape of the leg portions of the yoke adjacent a second end of the yoke.

16. The position sensor according to claim 15, wherein the yoke is formed in a shape such that a magnetic flux density received by the magnetic field detection portion monotonically changes at least within a part of the range of the relative movement as the magnetic field generation portion moves relative to the magnetic field detection portion in the predetermined moving direction.

* * * * *